(12) United States Patent
Candelore et al.

(10) Patent No.: US 10,579,732 B2
(45) Date of Patent: Mar. 3, 2020

(54) ACCESSIBILITY MENU FROM REMOTE CONTROL

(71) Applicant: Sony Corporation, Tokyo (JP)

(72) Inventors: Brant Candelore, Escondido, CA (US); Mahyar Nejat, San Diego, CA (US); Peter Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/631,791

(22) Filed: Jun. 23, 2017

(65) Prior Publication Data

US 2018/0373695 A1    Dec. 27, 2018

(51) Int. Cl.
| | |
|---|---|
| *G06F 17/27* | (2006.01) |
| *H04N 5/445* | (2011.01) |
| *G08C 17/02* | (2006.01) |
| *G08C 17/00* | (2006.01) |

(52) U.S. Cl.
CPC ......... *G06F 17/2765* (2013.01); *G08C 17/00* (2013.01); *G08C 17/02* (2013.01); *H04N 5/44513* (2013.01); *H04N 5/44543* (2013.01); *G08C 2201/30* (2013.01); *H04N 2005/44526* (2013.01); *H04N 2005/44569* (2013.01)

(58) Field of Classification Search
None
See application file for complete search history.

(56) References Cited

U.S. PATENT DOCUMENTS

| | | |
|---|---|---|
| 4,700,377 A | 10/1987 | Yasuda et al. |
| 5,327,176 A | 7/1994 | Forler et al. |
| 5,373,330 A | 12/1994 | Levine |
| 6,130,624 A | 10/2000 | Guyer |
| 6,320,621 B1 | 11/2001 | Fu |
| 6,457,681 B1 | 10/2002 | Wolf et al. |
| 6,532,592 B1 | 3/2003 | Shintani et al. |
| 8,629,754 B2 | 1/2014 | Schafer et al. |
| 9,538,251 B2 | 1/2017 | Aravamudan |
| 9,720,640 B2 | 8/2017 | Pedersen et al. |
| 9,743,032 B2 | 8/2017 | Robinson |
| 2004/0090424 A1 | 5/2004 | Hurley et al. |
| 2005/0114761 A1* | 5/2005 | Celik ................. G06F 17/3089 715/201 |
| 2005/0212685 A1 | 9/2005 | Gordon |
| 2007/0266152 A1 | 11/2007 | Chen |
| 2010/0060505 A1 | 3/2010 | Witkowski et al. |

(Continued)

FOREIGN PATENT DOCUMENTS

| | | |
|---|---|---|
| CN | 202872895 U | 4/2013 |
| KR | 20000061853 A | 10/2000 |
| WO | 2013028566 A2 | 2/2013 |

OTHER PUBLICATIONS

Brant Candelore, Mahyar Nejat, Peter Shintani, "Accessibility Remote Control for the Blind", related pending U.S. Appl. No. 15/681,015, filed Aug. 18, 2017.

(Continued)

*Primary Examiner* — Samira Monshi
(74) *Attorney, Agent, or Firm* — John L. Rogitz

(57) ABSTRACT

An accessibility button is provided on the remote control, which may replace any existing buttons that may be present for closed captioning. When the accessibility button is pressed, the TV screen text to speech function is immediately enabled, including accessing closed captioning functions.

19 Claims, 5 Drawing Sheets

(56) References Cited

U.S. PATENT DOCUMENTS

| | | | |
|---|---|---|---|
| 2010/0138918 A1 | 6/2010 | Kim et al. | |
| 2010/0158481 A1* | 6/2010 | Kaneko | G11B 27/105 386/241 |
| 2010/0235745 A1* | 9/2010 | Shintani | H04N 5/44513 715/719 |
| 2010/0286653 A1* | 11/2010 | Kubel | A61M 5/142 604/504 |
| 2011/0140847 A1 | 6/2011 | Schafer et al. | |
| 2011/0157467 A1 | 6/2011 | McRae | |
| 2013/0073998 A1* | 3/2013 | Migos | G06F 17/212 715/776 |
| 2013/0314598 A1 | 11/2013 | Koizumi | |
| 2014/0111315 A1 | 4/2014 | Geerlings et al. | |
| 2014/0160362 A1* | 6/2014 | Shintani | H04N 21/4122 348/738 |
| 2015/0348402 A1 | 12/2015 | Lim et al. | |
| 2017/0132913 A1* | 5/2017 | Hong | G08C 23/04 |
| 2017/0235412 A1* | 8/2017 | Cheong | G06F 3/033 345/173 |

OTHER PUBLICATIONS

Brant Candelore, Mahyar Nejat, Peter Shintani, "Accessibility Remote Control for the Blind", related U.S. Appl. No. 15/681,015, Non-Final Office Action dated Dec. 14, 2017.

Brant Candelore, Mahyar Nejat, Peter Shintani, "Accessibility Remote Control for the Blind", related U.S. Appl. No. 15/681,015, Applicant's response to Non-Final Office Action filed Dec. 19, 2017.

Brant Candelore, Mahyar Nejat, Peter Shintani, "Accessibility Remote Control for the Blind", related U.S. Appl. No. 15/681,015, Final Office Action dated Feb. 1, 2018.

Brant Candelore, Mahyar Nejat, Peter Shintani, "Accessibility Remote Control for the Blind", related U.S. Appl. No. 15/681,015, Applicant's response to Final Office Action filed Feb. 6, 2018.

"X1—TV is universal. Access should be as well." Retrieved on Nov. 15, 2017 from https://www.xfinity.com/accessibility.

Brant Candelore, Mahyar Nejat, Peter Shintani, "Accessibility Remote Control for the Blind", file history of related U.S. Appl. No. 15/893,370, filed Feb. 9, 2018.

Brant Candelore, Mahyar Nejat, Peter Shintani, "Accessibility Remote Control for the Blind", related U.S. Appl. No. 15/893,370, Non-Final Office Action dated Jul. 9, 2018.

Brant Candelore, Mahyar Nejat, Peter Shintani, "Accessibility Remote Control for the Blind", related U.S. Appl. No. 15/893,370, Applicant's response to Non-Final Office Action filed Jul. 12, 2018.

Brant Candelore, Mahyar Nejat, Peter Shintani, "Accessibility Remote Control for the Blind", file history of related U.S. Appl. No. 16/174,591, filed Oct. 30, 2018.

Brant Candelore, Mahyar Nejat, Peter Shintani, "Accessibility Remote Control for the Blind", related U.S. Appl. No. 16/174,591, Non-Final Office Action dated Nov. 28, 2018.

Brant Candelore, Mahyar Nejat, Peter Shintani, "Accessibility Remote Control for the Blind", related U.S. Appl. No. 16/174,591, Applicant's response to Non-Final Office Action filed Nov. 30, 2018.

Brant Candelore, Mahyar Nejat, Peter Shintani, "Accessibility Remote Control for the Blind", related U.S. Appl. No. 16/174,591, Final Office Action dated Jan. 10, 2019.

Brant Candelore, Mahyar Nejat, Peter Shintani, "Accessibility Remote Control for the Blind", related U.S. Appl. No. 16/174,591, Applicant's response to Final Office Action filed Jan. 11, 2019.

* cited by examiner

ACCESSIBILITY MENU FROM REMOTE CONTROL

FIELD

The present application relates to technically inventive, non-routine solutions that are necessarily rooted in computer technology and that produce concrete technical improvements.

BACKGROUND

Menus for vision- and hearing-impaired accessibility to audio video displays often are "buried" under multiple layers of higher order user interface menus. This makes accessing such menus to adjust impairment features of the display especially difficult for those with visual impairments. For those with hearing impairment, accessing menus to configure the look of the closed captioning also may be difficult.

SUMMARY

Present principles recognize the above problems and so provide a remote control with a dedicated accessibility button on it that when pressed immediately presents impairment features.

Accordingly, a system includes a remote control (RC) that may be, e.g., instantiated by a hand-holdable plastic body, an application on a computer such as a personal computer, etc. and an accessibility key associated with the RC. Circuitry is provided in the RC and is configured to receive a signal generated from an interaction with the accessibility key. At least one wireless transceiver communicates with the circuitry to, responsive to the signal, send a command to a display device to actuate a text to speech function of the display device, and/or display an accessibility menu. The circuitry also is configured to associate a first type of interaction with the accessibility key with a first accessibility setting. In non-limiting examples, the circuitry may be further configured to associate a second type of interaction with the accessibility key with a second accessibility setting. The circuitry is further configured to, responsive to receiving a signal representing interaction of the accessibility key of the first type, generate a command to establish the first accessibility setting on the display device. Moreover, in non-limiting examples the circuitry may be configured to, responsive to receiving a signal representing interaction of the accessibility key of the second type, generate a command to establish the second accessibility setting on the display device.

The circuitry may include at least one processor, and the system may include the display device.

In examples, the circuitry may be configured to, responsive to the signal, cause the wireless transceiver to send a command to the display device to present on a visual display closed captioning options.

In another aspect, a system includes a remote control (RC) that may be hand-holdable, and an accessibility key on the RC. Circuitry is provided in the RC and is configured to receive a signal generated from an interaction with the accessibility key. At least one wireless transceiver communicates with the circuitry to, responsive to the signal, send a command to a display device to actuate a text to speech function of the display device, and/or to present an accessibility menu.

In another aspect, a system includes a hand-holdable remote control (RC) and an accessibility key on the RC. Circuitry is provided in the RC and is configured to receive a signal generated from an interaction with the accessibility key. At least one wireless transceiver communicates with the circuitry. The circuitry is configured to associate a first type of interaction with the accessibility key with a first accessibility setting, and to associate a second type of interaction with the accessibility key with a second accessibility setting. The circuitry is further configured to, responsive to receiving a signal representing interaction of the accessibility key of the first type, generate a command to establish the first accessibility setting on the display device. Moreover, the circuitry is configured to, responsive to receiving a signal representing interaction of the accessibility key of the second type, generate a command to establish the second accessibility setting on the display device.

The details of the present disclosure, both as to its structure and operation, can be best understood in reference to the accompanying drawings, in which like reference numerals refer to like parts, and in which:

DETAILED DESCRIPTION

Figure 1:
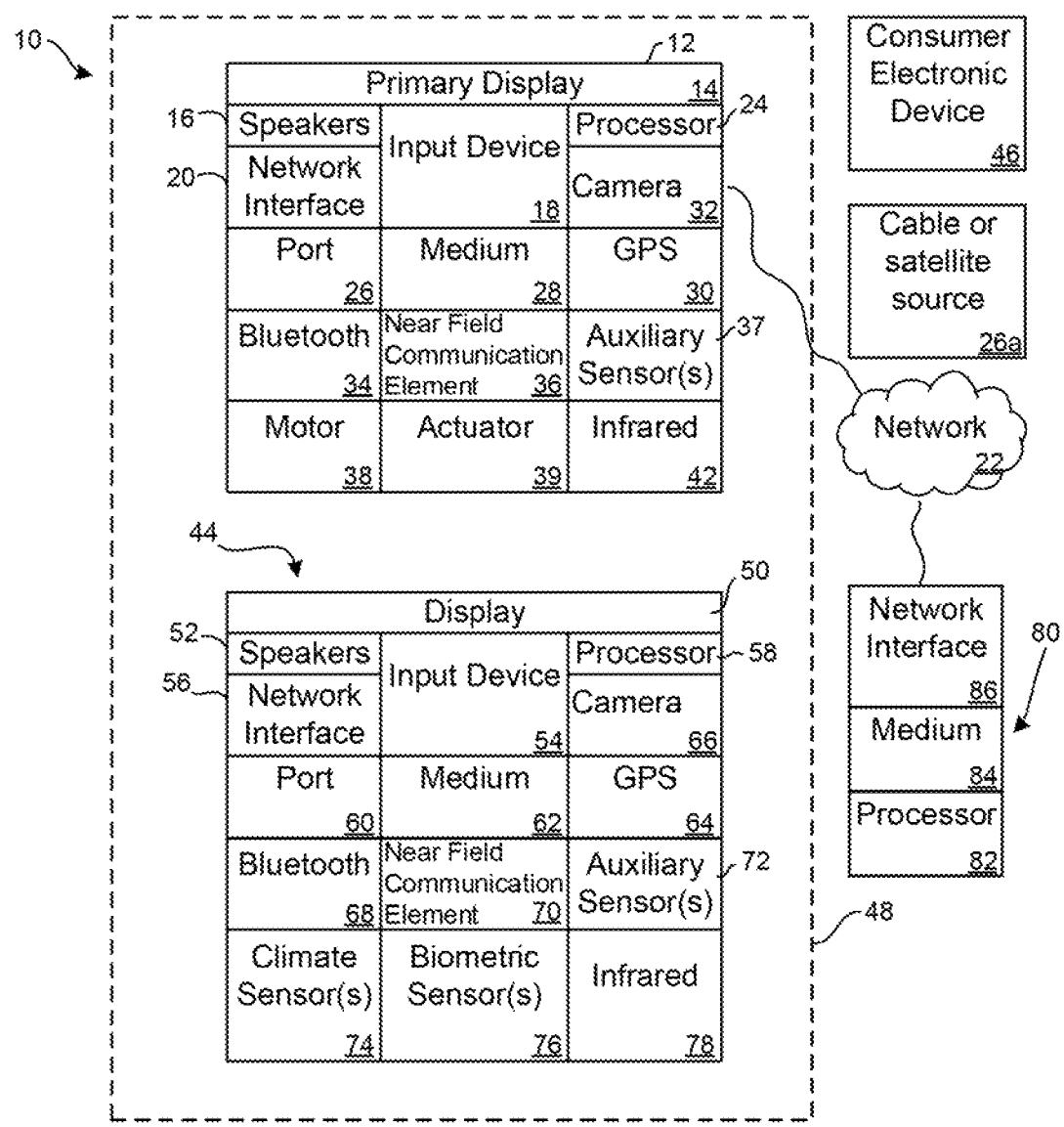
FIG. 1 is a block diagram of an example system including an example in consistent with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers and client devices in accordance with present principles.

Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figures 2, 2A, 2B:
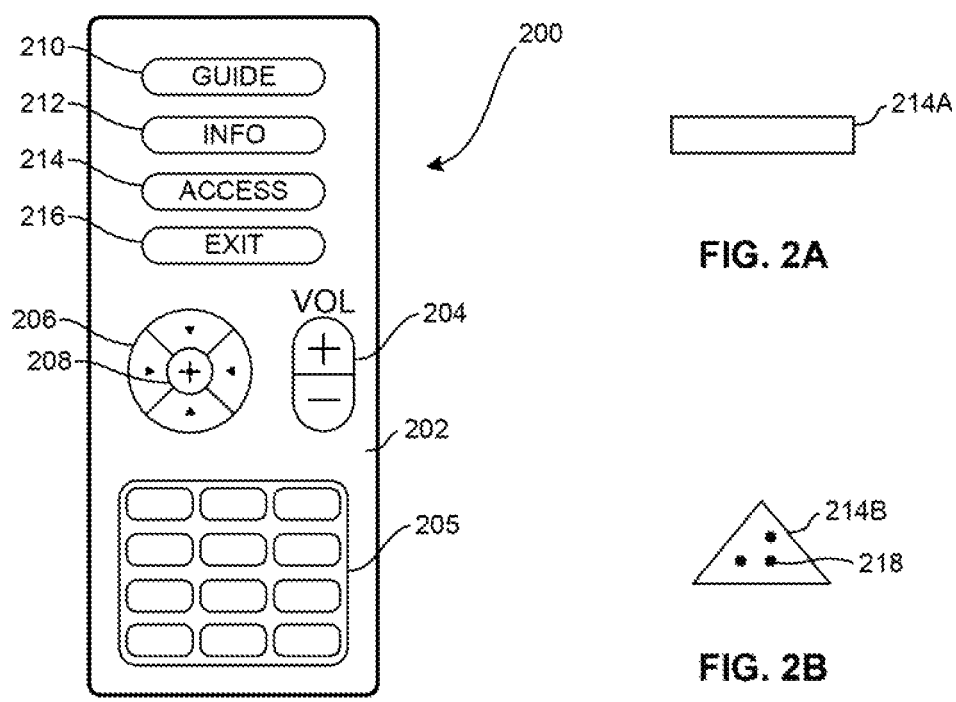
FIG. 2 is a plan view of an example remote control (RC) consistent with present principles.
FIGS. 2A and 2B are plan views of alternate accessibility keys.

FIG. 2 shows a remote control (RC) 200 that may include appropriate components of the above-described CE device 44. Thus, the RC 200 may include one or more internal processors, computer memories, and wireless transmitters such as IR command transmitters to control a device such as the AVDD 12.

As shown, the RC 200 includes a typically plastic, hand-holdable housing 202 with multiple input keys that can be manipulated by a person to cause wireless commands to be sent from the RC 200 to, e.g., the AVDD 12. For example, volume up and down keys 204 may be manipulated to respectively turn the volume of the speakers of the AVDD 12 up and down. An alpha-numeric keypad 205 may be provided on the RC 200 for inputting letters and/or numbers to the AVDD 12. Also, a directional input element such as a rocker 206 or directional keys may be provided with each arm of the rocker being manipulable to move a screen cursor up and down and left and right. If desired, a select key 208 may be located in the center of the rocker 206 for input of a "select" command.

Further, in the example shown the RC 200 may include a guide key 210 manipulable to send a command to present an electronic program guide (EPG) on the AVDD 12. Also, an info key 212 may be provided and can be manipulated to send a command to present information related to a selected program on the AVDD 12/An exit key 216 also may be provided to command the AVDD to exit, e.g., the EPG or info page.

According to present principles, an accessibility key (AK) 214 is included on the RC 200. In the example shown, the AK 214 is larger than the other keys on the RC, and has the same shape (oval) as the other keys. In other embodiments, the AK may have a different shape than the other keys on the RC 200. For example, an AK 214A may be rectilinear-shaped as shown in FIG. 2A or triangular-shaped as shown in FIG. 2B or other unique shape such as circular, compared to the other keys on the RC. If desired, a braille code 218 can be provided on the AK for further tactile identification of the AK by a person such as a vision-impaired person.

Circuitry such as one or more of the above-described processors/DSPs etc. may be provided in the RC 200 and may be configured to receive a signal generated from an interaction with the AK, such as a press of the AK, finger hover above the AK, etc. Responsive to the interaction with the AK, the RC 200 may send a command to the AVDD 12 to present a user interface (UI) such as the UI 300 shown in FIG. 3. In addition or alternatively, responsive to the interaction with the AK, the RC 200 may send a command to the AVDD 12 to actuate a talk back function of the AVDD 12. By "talk back" function is meant a text to speech function in which audible feedback played on one or more speakers of the AVDD 12 in response to user input such as queries or commands, including audio corresponding to visual UI features.

Figure 3:
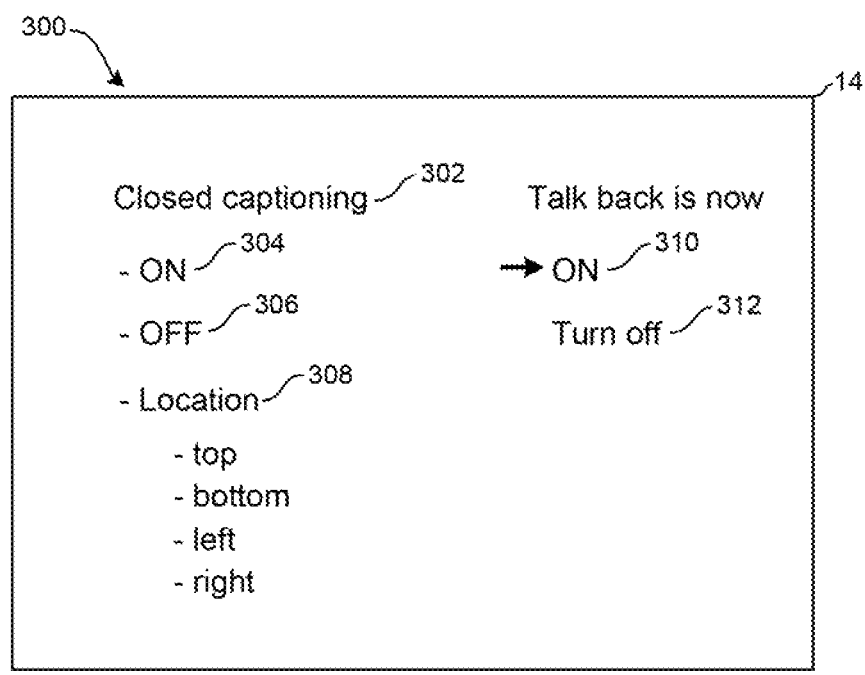
FIG. 3 is a screen shot of an example user interface (UI) consistent with present principles.

As shown in FIG. 3, the UI 300 may include closed captioning options 302 selectable by means of moving a screen cursor using, e.g., the RC 200. An on selector 304 may be selected to turn closed captioning on, meaning closed captioning will be presented on the AVDD 12, while an off selector 306 may be selected to turn off closed captioning.

When closed captioning is selected to be on, a list 308 of locations for the closed captioning may be provided to enable a user to select where the closed captioning will be presented on the display, e.g., at the top, or bottom, or left or right side of the display. The list 308 may be presented on the speakers of the AVDD 12 according to the talk back function.

Returning to the talk back function, as shown by the capitalized "on" message 310 talk back has been automatically enabled responsive to manipulating the AK 214. An off selector 312 may be selected to turn off the talk back function.

Figure 4:
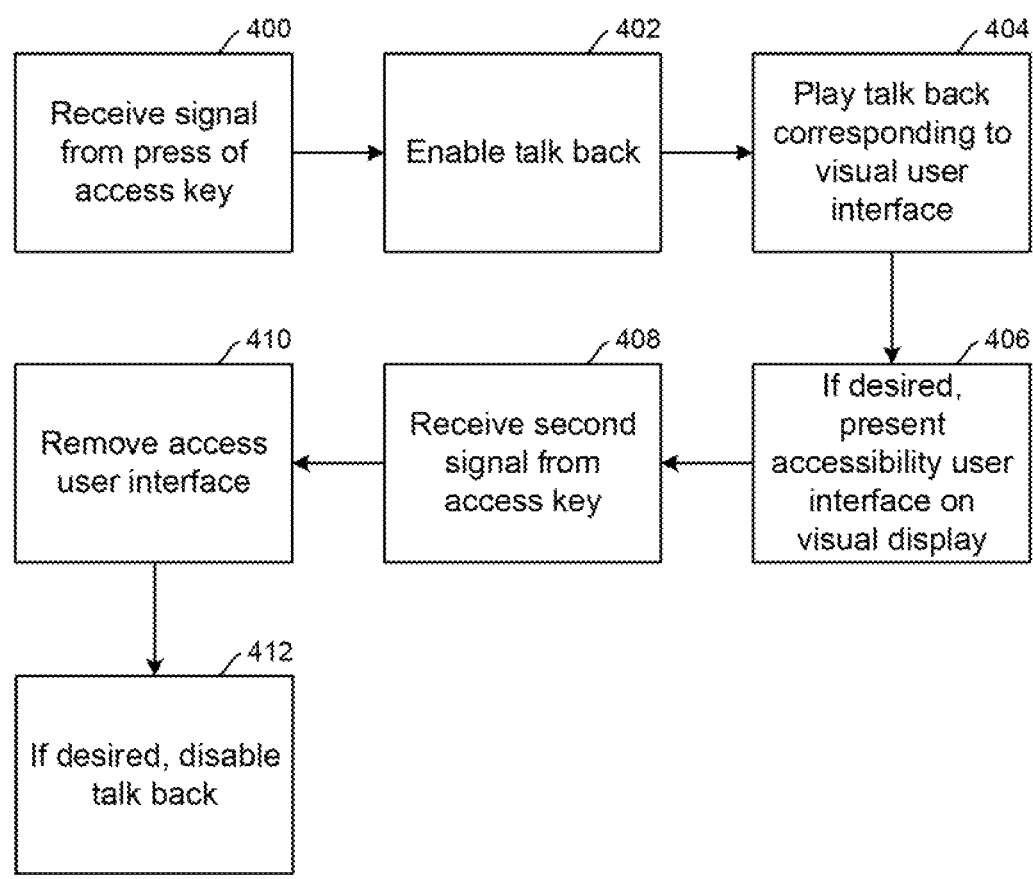
FIG. 4 is a flow chart of example logic consistent with present principles.

FIG. 4 illustrates logic consistent with FIGS. 2 and 3. At block 400 a signal is received by the circuitry in the RC 200 from an interaction with the AK 214. In response, talk back is enabled at block 402, so that audio corresponding, e.g., to the visible UI 300 may be played at block 404.

If desired, at block 406 an accessibility UI such as the example UI 300 may be presented on the AVDD 12 to enable establishing one or more accessibility options, including text-to-speech such as may be referred to as "talk back" and closed captioning preferences. When it is desired to remove the UI 300 from view, the user can press the AK 214 a second time, which is received at block 408 to cause the AVDD 12 to remove the accessibility UI at block 410. Talk may also be disabled if desired at block 412 responsive to toggling the AK 214.

Figure 5:
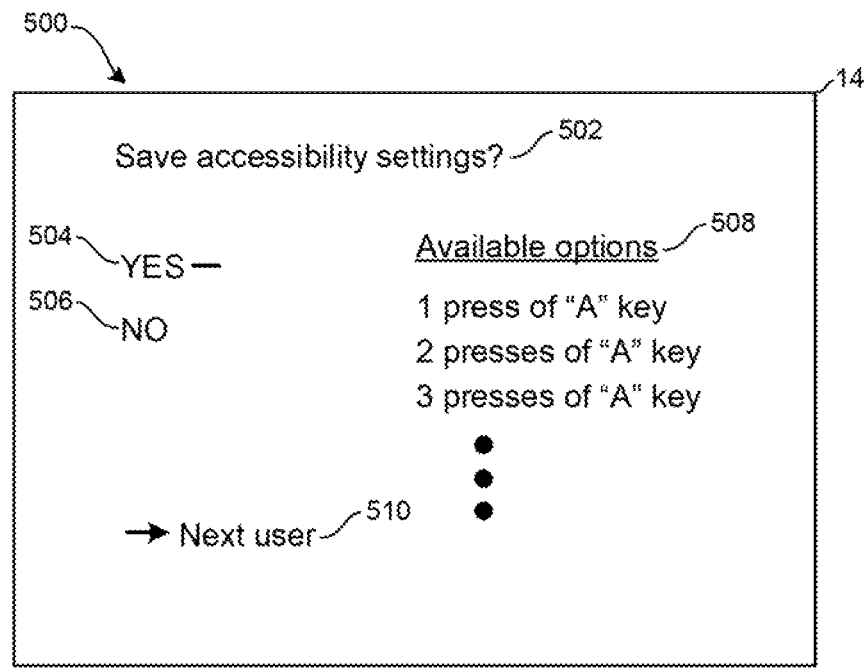
FIG. 5 is a screen shot of an example UI for establishing user access setting profiles.
Figure 6:
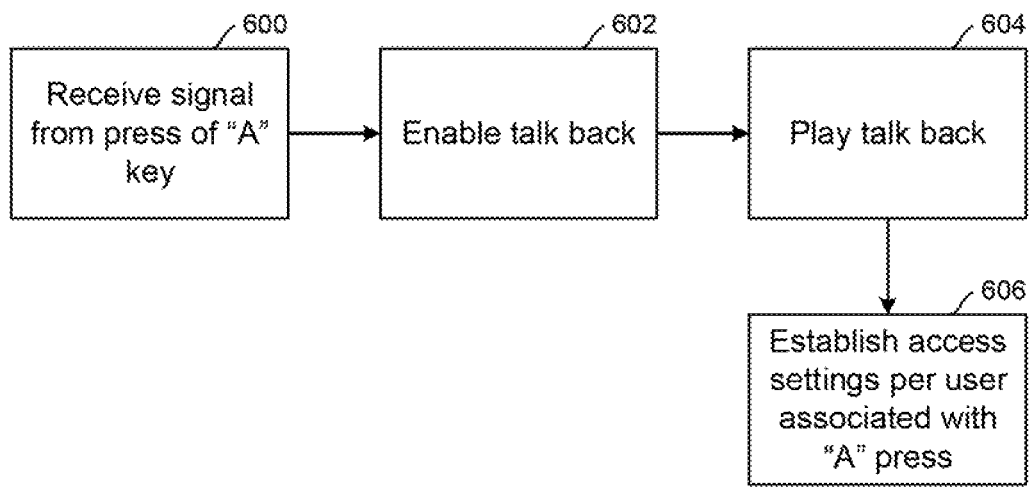
FIG. 6 is a flow chart of example logic consistent with FIG. 5.

In addition to the above-discussed functionality of the AK 214, FIGS. 5 and 6 illustrate alternative or additional functionality that may be provided by the AK. FIG. 5 illustrates a UI 500 that may be invoked on the AVDD 12 by any appropriate means that prompts a user to save accessibility settings as may have been established using the UI 300 of FIG. 3. A user can select a yes selector 504 to save the settings and a no selector 506 to not save the settings.

Additionally, a list 508 may be presented of setting establishment enablement options. More particularly, by selecting a type of press of the AK 214 from the list 508, a user can correlate future presses of the selected type with the saved accessibility settings, which are automatically established in the AVDD 12 when future AK manipulations of the selected type are effected. For example, as shown the user can select to correlate his personal settings with one, two, or three (in quick succession) presses of the AK. Additional press type options may include a press and hold, two presses and holds, etc. A next user selector 510 may then be selected to enable another user to establish a different set of accessibility settings, including no special accessibility settings at all.

FIG. 6 shows that at block 600 a signal from a press of the AK 214 may be received by the AVDD, which in response may automatically enable the above-described talk back function at block 602. Any prompts or other UI features of the AVDD may be presented audibly at block 604 using the talk feature. As described above, the user's accessibility settings are automatically established on the AVDD at block 606 responsive to the press of the AK 214.

Thus, multiple users can correlate respective AK press types with respective accessibility settings. For instance, an impaired user may establish accessibility settings such as presenting closed captioning automatically simply by manipulating the AK according to the type of manipulation associated with the impaired user's settings. When the impaired user is absent, a non-impaired person may then establish his or her accessibility settings, including the removal of all special accessibility options if so set, automatically by manipulating the AK according to the non-impaired user's type of manipulation. In this way, accessibility settings can be easily and automatically changed by users according to their preference simply by manipulating a single top level key (the AK 214) on the RC 200.

While particular techniques are herein shown and described in detail, it is to be understood that the subject matter which is encompassed by the present application is limited only by the claims.

What is claimed is:

1. A system comprising:
a remote control (RC) comprising plural keys;
an accessibility key on the RC in addition to the plural keys;
circuitry in the RC configured to receive a signal generated from an interaction with the accessibility key;
at least one wireless transceiver communicating with the circuitry to, responsive to the signal, send a command to a display device; wherein the circuitry is configured to:
associate a first type of user interaction with the accessibility key with a first accessibility setting comprising text-to-speech conversion, or closed captioning setting, or both text-to-speech conversion and closed captioning setting;
responsive to receiving a signal representing interaction of the accessibility key of the first type, generate a command to establish the first accessibility setting on the display device;
associate a second type of user interaction with the accessibility key with a second accessibility setting, the second type of user interaction being a different interaction than the first type of interaction; and
responsive to receiving a signal representing interaction of the accessibility key of the second type, generate a command to establish the second accessibility setting on the display device, wherein the first type of user interaction comprises at least a period of touch greater than zero, at least a first number of touches greater than zero, or both a first period of touch greater than zero and a first number of touches greater than zero, and the second type of user interaction comprises one or more of a second period of touch greater than zero and different than the first period of touch, a second number of touches greater than zero and different than the first number of touches.

2. The system of claim 1, wherein the circuitry is configured to, responsive to the signal, cause the wireless transceiver to send a command to the display device to present on a visual display closed captioning options.

3. The system of claim 1, wherein a text to speech feature is actuated responsive to the signal.

4. The system of claim 1, wherein an accessibility menu is displayed responsive to the signal.

5. The system of claim 1, wherein a text to speech feature is actuated responsive to the signal and an accessibility menu is displayed responsive to the signal.

6. A system comprising:
a remote control (RC) comprising plural keys;
an accessibility key on the RC in addition to the plural keys;
circuitry in the RC configured to receive a first signal generated from a first type of interaction with the accessibility key, the first type of interaction comprising a first number of presses greater than zero, or a first duration of press, or both a first number of presses greater than zero and a first duration of press;
at least one wireless transceiver communicating with the circuitry to, responsive to the first signal, send a command to a display device to actuate at least one accessibility setting of the display device, the accessibility setting comprising text-to-speech conversion, or closed captioning setting, or both text-to-speech conversion and closed captioning setting;
the circuitry being configured to receive a second signal generated by a second type of interaction with the accessibility key, the second type of interaction, the second type of interaction comprising a second number of presses greater than zero, or a second duration of press, or both a second number of presses greater than zero and a second duration of press, the first number of presses being different from the second number of number of presses, or the second duration of press being different from the first duration of press, or the first number of presses being different from the second number of presses and the second duration being different from the first duration.

7. The system of claim 6, wherein the circuitry comprises at least one processor.

8. The system of claim 6, wherein the circuitry is configured to, responsive to the signal, cause the wireless transceiver to send a command to the display device to present on a visual display closed captioning options.

9. The system of claim 8, wherein the text to speech feature includes an audio representation of the closed captioning options presented on the visual display.

10. The system of claim 8, wherein the signal is a first signal and the circuitry is configured to, responsive to a second signal generated from an interaction with the accessibility key, cause the wireless transceiver to send a command to the display device to remove from display the closed captioning options.

11. The system of claim 6, wherein the circuitry is configured to:
associate a first type of interaction with the accessibility key with a first accessibility setting;
associate a second type of interaction with the accessibility key with a second accessibility setting;
responsive to receiving a signal representing interaction of the accessibility key of the first type, generate a command to establish the first accessibility setting on the display device; and
responsive to receiving a signal representing interaction of the accessibility key of the second type, generate a command to establish the second accessibility setting on the display device.

12. The system of claim 1, wherein the accessibility key is larger than the plural keys.

13. The system of claim 1, wherein the accessibility key is of a different shape than the plural keys.

14. A system comprising:
a remote control (RC);
an accessibility key on the RC;
circuitry in the RC configured to receive a signal generated from an interaction with the accessibility key; and
at least one wireless transceiver communicating with the circuitry, wherein the circuitry is configured to:
associate a first number of presses, or a first duration of press, or both a first number of presses and a first duration of press the accessibility key with a first accessibility setting comprising text-to-speech conversion, or closed captioning setting, or both text-to-speech conversion and closed captioning setting;

associate a second number of presses, or a second duration of press, or a second number of presses and a second duration of press, or the first number of presses and the second duration of press, or the second number of presses and the first duration of press with the accessibility key with a second accessibility setting, the first number of presses being different from the second number of presses, the first duration being different from the second duration;

responsive to receiving a signal representing interaction of the accessibility key of the first type, generate a command to establish the first accessibility setting on the display device; and responsive to receiving a signal representing interaction of the accessibility key of the second type, generate a command to establish the second accessibility setting on the display device.

15. The system of claim 14, wherein the circuitry is configured to, responsive to the signal, send a command to the display device to actuate a text to speech function of the display device.

16. The system of claim 14, wherein the circuitry comprises at least one processor.

17. The system of claim 14, wherein the circuitry is configured to, responsive to at least the signal representing interaction of the accessibility key of the first type, cause the wireless transceiver to send a command to the display device to present on a visual display closed captioning options.

18. The system of claim 17, wherein the text to speech feature includes an audio representation of the closed captioning options presented on the visual display.

19. The system of claim 14, comprising the display device.

* * * * *